Sept. 28, 1965  S. J. POPEIL  3,208,309
VEGETABLE CUTTER AND METHOD OF MAKING SAME
Filed June 28, 1963  3 Sheets-Sheet 2
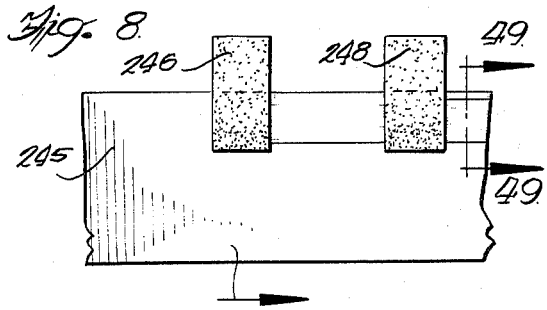
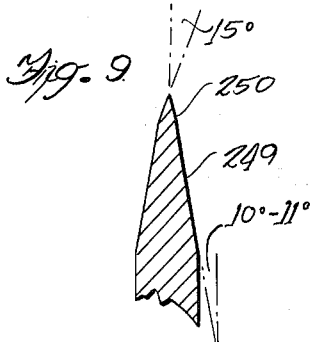
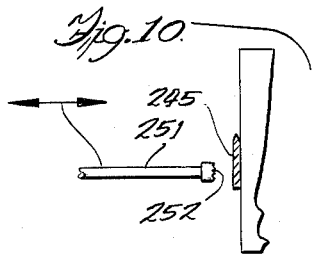
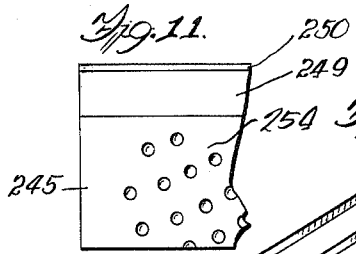
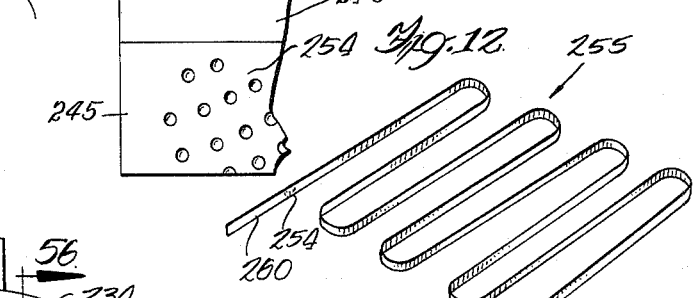
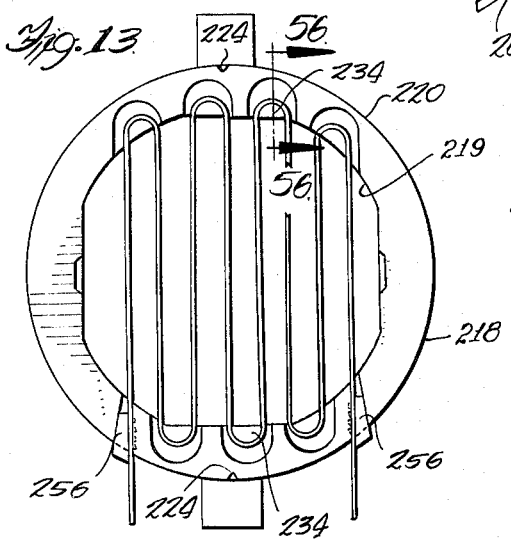
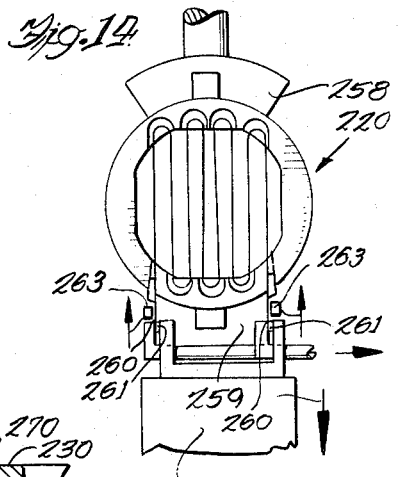
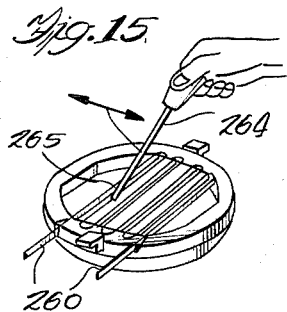
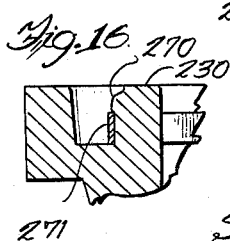
Inventor
Samuel J Popeil
Attorney Sept. 28, 1965    S. J. POPEIL    3,208,309
VEGETABLE CUTTER AND METHOD OF MAKING SAME
Filed June 28, 1963    3 Sheets-Sheet 3
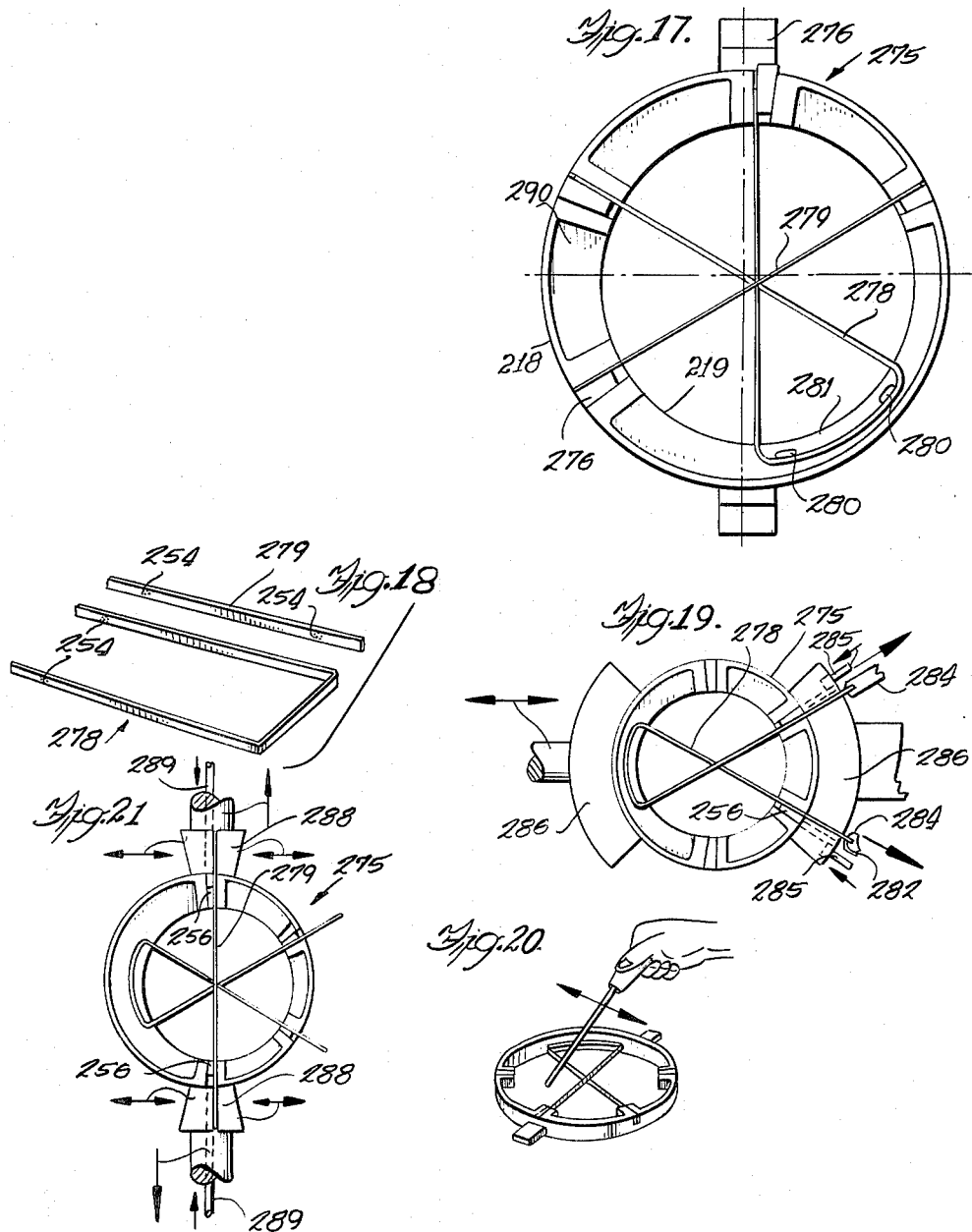

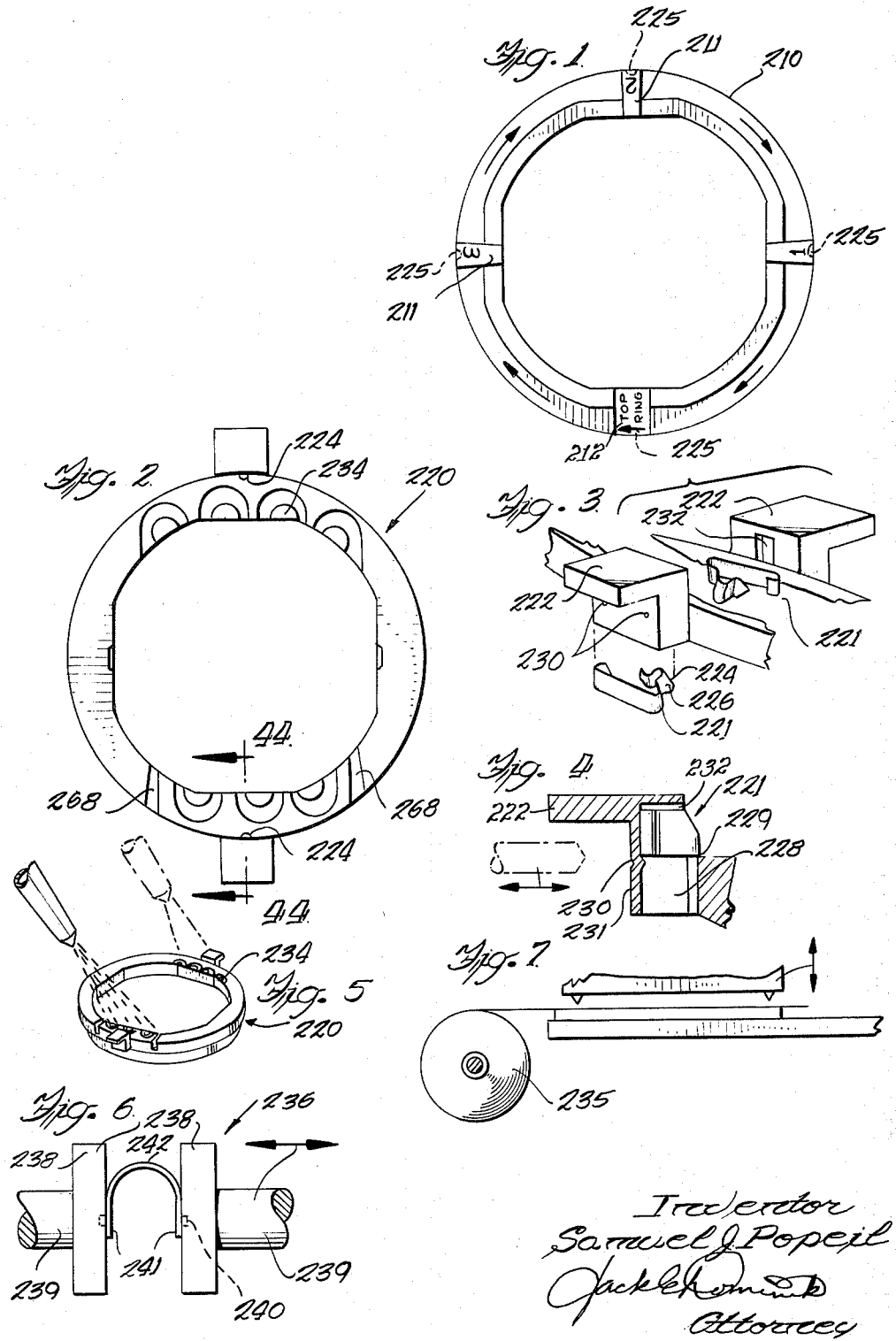

United States Patent Office 3,208,309
Patented Sept. 28, 1965

3,208,309
VEGETABLE CUTTER AND METHOD OF MAKING SAME
Samuel Joseph Popeil, Chicago, Ill., assignor to Feature Products, Inc., Chicago, Ill., a corporation of Illinois
Filed June 28, 1963, Ser. No. 291,343
6 Claims. (Cl. 76—101)

The present invention relates to a variable cut dicer-slicer which finds its utility in the preparation of raw and cooked vegetables, fruits, and other foods and more particularly it relates to the method of manufacturing cutter rings for variable cut dicer-slicers.

This application is a continuation-in-part of previously filed patent applications 847,743 filed October 21, 1959, now abandoned, and 38,689 filed June 6, 1960, now U.S. Patent No. 3,112,781, issued December 3, 1963.

The variable cut dicer-slicer device disclosed in the above mentioned patent comprises a pair of parallel blade cutter rings which are arranged in a unique inter-relationship so that the device may be used as a dicer-slicer, multiple cut slicer, and variable thickness slicer, which will handle, for example, an entire tomato with one push. It can also dice onions into hundreds of small squares, or it can cut carrot sticks, french fries, dice beets, and slice pickles.

Cutter rings manufactured in accordance with the present invention are particularly applicable for use in a variable cut dicer-slicer device of the type disclosed in this patent. However, it will be apparent from the description which follows that the method is equally applicable for manufacturing cutter rings and the like for other devices as well.

It is therefore an object of the invention to provide an improved method for manufacturing cutter rings and the like.

It is a further object of the invention to provide an improved method for manufacturing annular cutter rings having a plurality of parallel blades formed from a ribbon-like single continuous blade, the cutter ring having opposed mounting stations.

It is a still further object of the invention to provide an improved method for manufacturing annular cutter rings of the above type for insuring adequate prestressing of the blades with a high degree of uniform prestressing in each of the cutting elements.

Further objects and advantages of the present invention will become apparent as the following description of an illustrative embodiment proceeds, taken in conjunction with the accompanying drawings, shown for illustrative purposes, in which:

FIGURE 1 is a top view of a top ring construction.

FIGURE 2 is a top view of the bottom ring construction.

FIGURE 3 is a partially broken, partially exploded, perspective view of the bottom ring illustrating the insertion of the interlock spring.

FIGURE 4 is a sectional view of the interlock and spring taken along section 44—44 of FIGURE 2.

FIGURE 5 is a perspective, partially diagrammatic view of the method step of coating the blade support pins.

FIGURE 6 is a diagrammatic view of the blade testing mechanism.

FIGURE 7 is a front elevation of the blade cutting mechanism.

FIGURE 8 is a front elevation diagram of the blade sharpening step.

FIGURE 9 is an enlarged transverse action of the blade taken along section 49—49 of FIGURE 8.

FIGURE 10 is a diagrammatic view of the dimpling operation performed on the blade ends.

FIGURE 11 is an enlargd view of an end of the blade showing the dimple pattern on the blade.

FIGURE 12 is a perspective view of the blade as convoluted prior to insertion into the ring.

FIGURE 13 is a top view of the convoluted blade after positioning in the bottom ring but prior to prestressing.

FIGURE 14 is a top view showing diagrammatically the blade prestressing and locking method.

FIGURE 15 is a perspective diagrammatic view showing the blade strumming step.

FIGURE 16 is an enlarged sectional view taken along section 56—56 of FIGURE 13 showing the blade locking step.

FIGURE 17 is a bottom view of the wedger.

FIGURE 18 is a perspective view of the wedger blade elements as prepared for insertion into the wedger ring.

FIGURE 19 is a diagrammatic view of the blade prestressing of the crossed blades in the wedger.

FIGURE 20 is a diagrammatic showing of a strumming of the crossed blades in the wedger.

FIGURE 21 is a diagrammatic view of the wedger single blade prestressing and locking mechanism.

The variable cut dicer-slicer is described in detail in the above mentioned patent may be generally described as having a base provided with a pusher top portion which reciprocates axially toward a cutter ring assembly which is housed in the base and in a plane perpendicular with that of the motion of the pusher portion. The cutter ring assembly contemplates two cutter rings with one of the cutter rings radially adjustable with relationship to the other. The top cutter ring is made radially adjustable, and provided with a safety interlock mechanism which accomplishes the twofold purpose of indexing the top cutter ring to the proper location for various cuts and preventing the pusher top portion from fully engaging the cutter blades in interfit relationship unless the proper adjustment has first been made. The pusher top portion is pivotally connected to the base in such a manner that at the initial portion of the downstroke the pusher top portion can be tilted rearwardly to provide visual inspection and accurate location of the foodstuffs to be cut by the cutter ring assembly prior to use. Thereafter, the pusher top portion is pivoted over into the cutting position and pushed downwardly while out of the way of any fingers.

As it is particularly pointed out in the above mentioned patent, the blades must be prestressed prior to securing in place. With a blade $10/1000$ inch thick and $80/1000''$ wide, a prestressing in the range of 100 to 200 pounds per blade will permit satisfactory cutting. It will be realized that a blade of the cross-section dimensions described will be prestressed within a range of 125,000 #/in.$^2$ to 250,000 #/in.$^2$ when the tension force ranges between 100 to 200 pounds. A stainless clock spring steel, which has a maximum tensile strength of approximately 300,000 #/in.$^2$, produces excellent results. If the blades are not sufficiently prestressed, jamming occurs and the force required to cut the foodstuffs becomes excessive. In the event the blades are prestressed excessively, the cutter rings may be distorted, and although the blades will cut satisfactorily, their life expectancy will be shortened. Thus, the prestressing of the blades to a point which permits easy passage of food is critical. The degree of prestressing for various blades can be determined and checked by plucking the blades and checking their pitch. For example, the pitch of a blade $60/1000$ inch wide and $10/1000$ inch thick of blued carbon steel, of a length as would provide optimum cutting action in a device made in accordance with the principles of the invention, should be at least 2400 cycles per second (c.p.s.) and for best results not in excess of 3200 c.p.s. The stainless clock spring behaves similarly.

To prevent a loss of tension in the blades after they have been assembled within the rings, provision may be made for reinforcing the ring construction. As shown therein, a slot is provided parallel with the blades and alongside the central openings of the rings. The slot is subsequently filled with a steel reinforcing rod which is prepared slightly oversize and pressfitted into the slot. The rod then serves to strengthen the rings at their four corners, which are critical stress points, and prevent a slow loss of tension in the blades due to a pressure deformation of the rings.

METHOD OF CUTTER RING MANUFACTURE

The method of the present invention, as previously indicated, is particularly applicable for prestressing the individual blade elements within the cutter rings. As will be explained in detail hereinafter, in order to insure the prestressing of the individual blade elements within the top ring 210 and bottom ring 220, several combined steps of manufacture are required. As to the rings containing the parallel blades, the ring itself must be specially prepared, the blade specially prepared and tested, and the ring assembly undertaken in a coordinated manner with the previous steps. Similarly as to the construction of the wedger (as shown in FIGURES 18 through 22), particular steps in manufacture should also be followed. Each of these points will be discussed under appropriate headings below:

Ring preparation

Both the top ring 210 and the bottom ring 220 are molded out of round. In a successful commercial embodiment, the dimensions of the peripheral portion of the ring are 4.345" x 4.390", the longer dimension being along that axis parallel with the parallel blades. The rings are both molded out of a very high strength aluminum known in the trade as 364ALCOA. After the rings have been molded to the eliptical degree as indicated, approximately .045", they are then heat treated for approximately ten hours at 340° F. to increase their resilience to a desired level. After the heat treating process is concluded, the two interlock springs 221 are placed in position as illustrated in FIGURE 3, and then after being snap-fastened into their ultimate nesting relationship with the pocket 228, 232 as illustrated in FIGURE 4, a staking mark 230 is formed as illustrated in order to secure the interlock spring 221 in position.

Thereafter, the crescent shaped blade support pins 234 are sprayed in such a manner that their vertical curvilinear faces are coated with a Teflon spray as illustrated in FIGURE 5. The Teflon coating is preferably air-cured, and not baked smooth. In the event the Teflon coating is baked smooth, the curvilinear portions of the crescent shaped pins 235 would be too slippery and possibly the blade could slip off on too many of the units to render this operation commercial.

By molding the ring to an out of round configuration, and then Teflon coating the crescent-shaped pins 234, it is then in a condition for being deformed at the time the blades are inserted in a convoluted manner about the crescent-shaped pins 234, and along with the additional method steps of assembly to be outlined hereinafter, a remarkable degree of uniformity in the prestressed relationship between the blade and the rings is achieved. Prior to assembly, however, the blades themselves are specially prepared.

Blade preparation

The blades approximate .010" x .080" and are normally supplied on a coil 235 as indicated in FIGURE 7. One type of blade found commercially desirable is known as Sandvik 11R50 or 11R51. These blades are first tested as to each coil to insure that the necessary degree of resilience is present. The testing device 236 is shown in FIGURE 6. The testing device contemplates a pair of faces 238 which are moved by driving rods 239, the faces having blade support recesses 240 to receive the ends 241 of the sample strip 242.

The blade is first cut to a length approximating .984". The ends 241 of the blade sample 242 are then placed in the recesses 240, and the driving rods 239 move towards each other in order to bend the sample blade 242 to a 180° radius. In the course of the compression, the blade must not fracture before the distance between the blade tester faces 238 is .870". The best range for bending is between .880–.900". This leaves a radius of curvature range to fracture approximating the range between .032" to .047".

The steel employed, one example of which is the Sandvik 11R50 and 11R51 as indicated, should have an ultimate tensile strength in the range of 320,000 p.s.i. to 348,000 p.s.i. This is a steel used primarily in clock mainsprings. The blades themselves, after the samples have been tested and are satisfactory, are then double-ground for sharpening as indicated in FIGURE 8. There it will be seen that the blade 245 is impressed by grinding wheels 246, 248. The first grind 246 takes the main face 249 down to a point where it prescribes an angle between 10° and 11° with the long axis of the blade (see FIGURE 9). The second grinding step accomplished by grinding wheel 248 (as illustrated in FIGURES 8 and 9), accomplishes the second bevel thereby defining the cutting edge 250 to an angle of approximately 15° with the long axis of the blade. Thus after the blade is fully ground, the included angle of the cutting faces approximates 30°, whereas the included angle of the primary cut defining faces 249 is approximately 21°. After the grinding operation, the blade is cut to an oversize length as by stamping as is best illustrated in FIGURE 7. Once the blade is cut, it is then subjected to the end dimpling operation as illustrated in FIGURES 10 and 11. There it will be seen that the dimpler 251 has an end pattern 252 which, when impressed upon the end of the blade 245 creates the dimple pattern 254 as shown in FIGURE 11. The dimple pattern is proportioned to spot at least eight to twelve dots on the end of the blade, each of the dots extending from the reverse side of the pattern 254 by approximately .003".

Ring assembly

After the blade has been tested and prepared in accordance with the foregoing, it is then formed into the convoluted configuration 255 as illustrated in FIGURE 12. This in conveniently done by means of wrapping the ends around a plurality of opposed parallel fingers, and then separating the fingers with the ends secured so that the blade will take a permanent set in the general form as shown.

After the blade is convoluted, the convoluted assembly 255 is placed within the ring as indicated in FIGURE 13, and the wedges 256 driven into place. In this configuration, the bottom ring 220 or the top ring 210 can be conveniently stored on the assembly line awaiting its prestressing and locking.

As diagrammatically illustrated in FIGURE 14, the rings (top ring 210 or bottom ring 220) are then placed into a fixture with opposed compressive jaws 258, 259. The movable jaw 258 is so positioned and powered that it can compress the ring 220 along the axis of the parallel portions of the convoluted blade assembly 255. The rings 210, 220 are then compressed to approximately half of their eccentricity (since the total eccentricity in the commercial embodiment is .045" the compression is .0225"), thus bringing the ring into a perfect round configuration.

While the ring is compressively urged to its normal size, the blade ends 260 are firmly grasped by the tensioning jaws 261 and the tensioning assembly 262 is pulled in order to place a load of approximately 175–200 lbs. which in turn prestresses the convoluted blade to approximately 150,000 p.s.i. along each of the parallel blade elements.

The pull cycle during which time the tensioning assembly 262 is putting the aforementioned load on the blade ends 260 approximates eight seconds. During this time, in the manner generally shown in FIGURE 15, the blades are actually strummed by means of a strummer 264 which is blunted at its end 265 and played almost like a banjo or ukulele. During the strumming operation, the curved portions of the convoluted blade assembly 255 are permitted to slide over the curvilinear portion of the crescent-shaped support pins 234 as a result of the assistance given by the partially cured Teflon coating in the step illustrated in FIGURE 5. A brisk strumming for approximately five seconds under the load indicated until such time as an audible uniformity is observed (i.e. each blade gives the same tone), is sufficient to insure not only adequate prestressing, but uniform prestressing. After the prestressing is completed, the wedge locking hammers 265 engage the protruding ends of the wedges 256, and drive the same into the wedge slots 268.

The wedges are formed of an aircraft aluminum generally known in the trade as 7075T6 aluminum, and the wedges in combination with the ring construction itself not only are locked into position by the self-energizing action of the prestressed blade, but additionally by the deformation of the perforation pattern 254 as illustrated by the pluraltiy of dimples in FIGURE 11. The unit is subsequently withdrawn from the jig, the excess blade ends 260 removed, and the construction of the blade with its preformed prestressed elements is completed. As illustrated in FIGURE 15, the strumming would be at the sharpened portion of the blades. This is not too harmful in the event a soft point 265 is employed on the strummer 264, but for better commercial results the tooling should be so disposed that the sharpened edge 250 of the blade points downwardly so that the strumming takes place on the rear end blunt portion.

As indicated above, the excess blade ends 260 are trimmed off, and then the blades are staked in place by means of a crescent shaped hammer hitting the upper portion of the crescent shaped pin 234 as best illustrated in the transverse sectional view FIGURE 16. The overlapping stake portion 270 lockingly secures the curved blade end 271 in place as seen in FIGURE 16. It will be borne in mind that because of the Teflon treating of the curvilinear portion of the crescent shaped pin 234, there is a tendency for the prestressed blade to slip up over the pin. By providing the pin with the stake 270, this prospect is eliminated. It is quite important that the staking operation be performed on the top ring 210 as the pressure on the blades is to remove them from the crescent shaped pins 234, but also it has been found desirable to similarly stake the blodes in position on the bottom ring 220 in order to insure maximum security of the blade to the ring.

WEDGER ASSEMBLY

Ring preparation

Referring now to FIGURE 18, it will be seen that the modified wedger is molded with the central aperture somewhat eccentrically positioned. Indeed, the center point which is the intersection of the single blade 279 and the cross-blade 278, is slightly below and to the right of the perfect center of the unit. This construction is designed to conform with the pattern in the pusher head shown in FIGURE 17 which reduces very substantially the number of pusher teeth required, and correspondingly increases their effective working area.

The wedger ring 275 is molded of the same type of aluminum as the cutter rings, and is heat-treated in a similar fashion. All the steps are substantially the same as with the parallel blade rings, except that the securing lugs 280 are cast into the crossed blade support segment 281 for subsequent peening to lock the flat end of the cross-blade 278 in position.

Blade preparation

The blades are tested and prepared also in substantially the same manner as for the convoluted parallel blades. As will be observed in FIGURE 19, the cross-blade portion 278 is in the shape of a croquet wicket, the dimpled pattern 254 being formed near the free ends of the blades in much the same manner as with the convoluted blade assembly 255 described above.

The cross-blade 278 is then placed in a jig generally as illustrated in FIGURE 20, the free ends 282 being grasped by means of the tensioning jaws 284 whereupon the prestressing to approximately one-half of the ultimate strength of the blades is achieved prior to compressing the wedge locking elements 285 to position the wedges 256 in locked engagement with the dimpled ends of the cross-blade assembly 278. During this process the ring is not compressed, but the blades are strummed in accordance with the method shown diagrammatically in FIGURE 21, very similar in effect to that employed with the rings having parallel blades.

The wedger ring 275, as indicated above, is not compressed by the orienting segments 286 except to a sufficient degree to hold it in position while the prestressing of the cross-blade takes place.

After the cross-blade is completely secured in its prestressed relationship, the wedger ring 275 is then positioned for the insertion of the single blade 279 as illustrated in FIGURE 22. The single blade 279 is then prestressed to approximately one-half of its ultimate strength, the same being held at its free end between the jaws 288, and the wedge element 256 is then locked into position by means of the wedge lock assembly 289, whereupon the prestressing and locking of the blades is completed. Thereafter the free ends of the blade are trimmed off, and any extension or excess protruding around the periphery of the ring left by the wedge or the blade free ends are ground off, and the assembly of the wedger is completed. After the wedger assembly has been completed, or optionally before the trimming off of the blade ends, the upstanding lugs 280 are peened downwardly to overlap the end portion of the cross-blade assembly 278, thereby locking the same on the segment 281 against dislodgement. Because the blade elements are uniformly prestressed, the circumferential roundness of the wedger assembly is retained uniformly by means of the prestressing of each one and positioning of the same equally around the ring.

While it will be appreciated that various alternatives, modifications, and equivalent constructions as well as methods may be employed, and further that the mechanisms and methods may be employed, and further that the mechanisms and methods disclosed and described in detail are illustrative, there is no intention to limit the scope of the invention to the specific disclosure, but rather to refer to the appended claims for a definition of the invention.

I claim:
1. The method of assembling an annular cutter ring having a plurality of parallel blades formed from a ribbon-like single continuous blade, the cutter ring having opposed blade mounting stations, comprising the steps of: forming the annular ring to a size larger along the diameter parallel with the blades than the axis perpendicular to the blades, convoluting the blade and positioning the same in the ring, tensioning the blade by pulling its two ends while simultaneously strumming the blade convolutions until a pitch equalization is achieved thereby denoting uniform prestressing while simultaneously compressing the ring on its elongated diameter, and locking the blade ends within the ring whereby upon releasing the blade its prestressed condition is maintained by the elastic deformation of the ring.

2. The method of assembling an annular cutter ring having a plurality of parallel blades formed from a ribbon-like single continuous blade, the cutter ring having opposed blade mounting stations, comprising the steps of: forming the annular ring to a size larger along the diameter parallel with the blades than the axis perpendicular to the blades, forming a plurality of dimples on the blade ends, convoluting the blade and positioning the same in the ring, tensioning the blade by pulling its two ends while simultaneously strumming the blade convolutions until a pitch equalization is achieved thereby denoting uniform prestressing while simultaneously compressing the ring on its elongated diameter, and locking the blade ends within the ring.

3. The method of assembling an annular cutter ring having a plurality of parallel blades formed from a ribbon-like single continuous blade, the cutter ring having opposed blade mounting stations, comprising the steps of: forming the annular ring to a size larger along the diameter parallel with the blades than the axis perpendicular to the blades, deforming a portion on the blade ends, convoluting the blade and positioning the same in the ring, tensioning the blade by pulling its two ends while simultaneously compressing the ring on its elongated diameter, and locking the blade ends deformingly within the ring whereby upon releasing the blade its prestressed condition is maintained by the elastic deformation of the ring.

4. In the method of claim 3, the additional step of coating the mounting stations with Teflon prior to positioning the convoluted blade on the mounting stations.

5. In the method of claim 3, the additional step of simultaneously strumming the blade convolutions while the same are being tensioned.

6. In the method of claim 3, the additional step of deforming the ends of the blade by dimpling the same to define a pattern of projections and recesses.

References Cited by the Examiner

UNITED STATES PATENTS

| | | | |
|---|---|---|---|
| 2,283,030 | 5/42 | Bakewell | 146—169 |
| 2,467,302 | 4/49 | Forster et al. | 76—101 |
| 2,521,059 | 9/50 | Goldberg | 76—101 |
| 2,572,770 | 10/51 | Shadduck | 146—169 |
| 2,581,501 | 1/52 | Shaver | 146—169 |
| 2,911,023 | 11/59 | Kennedy | 146—169 |

GRANVILLE Y. CUSTER, Jr., *Primary Examiner.*

J. SPENCER OVERHOLSER, *Examiner.*